(No Model.)

A. FITZ-GERALD.
HANGING FERNERY.

No. 545,952. Patented Sept. 10, 1895.

Witnesses
Perry Ringman
F. M. Townsend.

Inventor
Alice Fitz-Gerald
by Hazard Townsend
her atty.

United States Patent Office.

ALICE FITZ-GERALD, OF DUARTE, CALIFORNIA.

HANGING FERNERY.

SPECIFICATION forming part of Letters Patent No. 545,952, dated September 10, 1895.

Application filed May 27, 1895. Serial No. 550,789. (No model.)

*To all whom it may concern:*

Be it known that I, ALICE FITZ-GERALD, a subject of the Queen of Great Britain, residing at Duarte, in the county of Los Angeles and State of California, have invented a new and useful Hanging Fernery, of which the following is a specification.

The object of my invention is to artificially grow ferns in the highest perfection, most attractive form, and most natural manner with the least labor and attention. I accomplish this by means of the device described herein and illustrated in the accompanying drawings.

Figure 1:
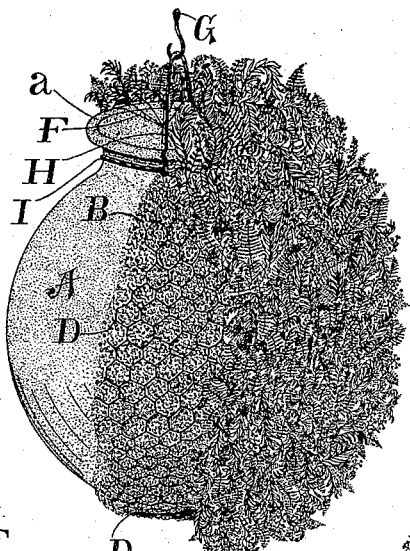
Figure 2:
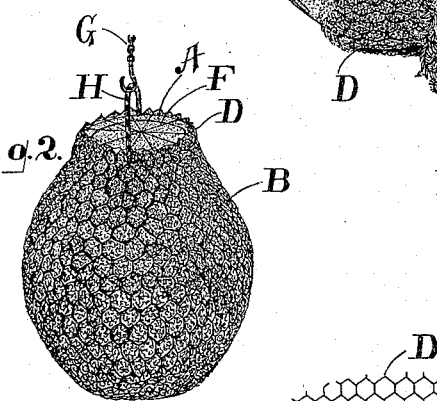
Figure 3:
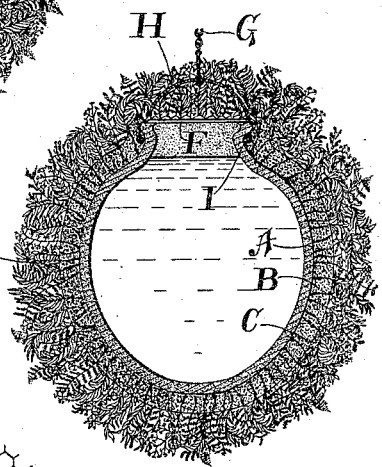
Figure 4:
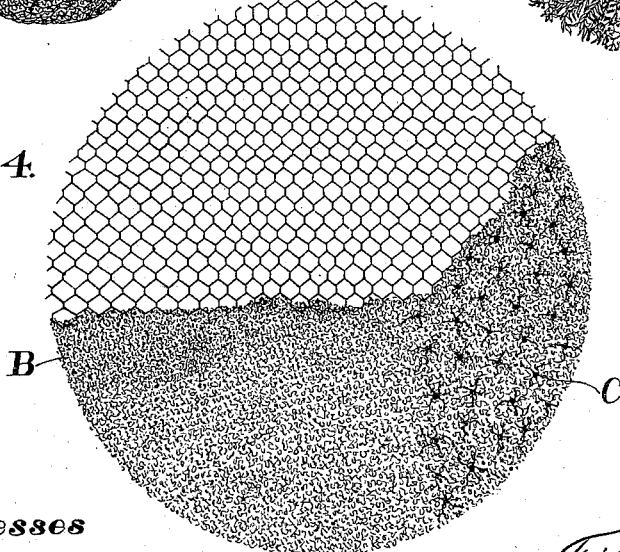
Figure 5:
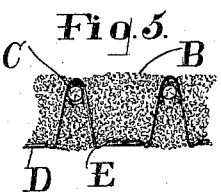

Figure 1 is a fragmental perspective view of my newly-invented hanging fernery, portions being broken away to expose the structure. Fig. 2 shows the same unbroken before the ferns are grown. Fig. 3 is a vertical midsection with the ferns growing. Fig. 4 illustrates the way in which the mat of fern-roots and moss is prepared to be applied to the earthen water-vessel. A part only of the mat is completed. Fig. 5 is a transverse section of a fragment of the mat.

My new hanging fernery comprises the combination of the open-mouthed porous earthen water-containing vessel A, through which the water will seep slowly, and a suitable external covering or outer mat of porous fern-root-containing material B, preferably moss, in which are embedded the fern-roots C, and which material is adapted for holding moisture and sustaining the growth of the ferns, the whole being secured to the outside of the earthen vessel by suitable means, such as wire-netting D. In practice I use live moss for the outer covering, and the same grows naturally, thus adding to the effectiveness and making a natural covering for the fern-roots.

I will now describe the manner of making my new hanging fernery. I first lay out upon the ground or some other suitable surface a wire-netting D, of suitable size and shape, so that when the fern-roots and their covering are placed thereon and the whole is folded about the vessel the netting will come to the top of the vessel and can be fastened there. Upon this netting I first place the outer covering B of moss. I use a single layer about two inches in thickness, laying this upon the netting with the moss-roots uppermost. Upon this I place, with the roots uppermost, the ferns, from which the stems and leaves have been removed. I place the roots at suitable distances apart—say about four inches. I next sew the roots in place with wire or other suitable strands E. When the roots have thus been secured, I place the earthen vessel upon the center of the mat thus formed and draw the mat up around the vessel, shaping it to the vessel, and finally fastening its upper edges at the top of the vessel by wires F, extending across the mouth of the vessel. By fastening the mat in this way the ferns can be made to grow to the top of the vessel, so that when grown they entirely hide the vessel from view. When the mat has thus been fastened, the vessel is suspended by a chain or cord G, fastened to the handle H, which I secure to the earthen vessel before the mat is applied. The handle H may be conveniently made of strong galvanized wire, fastened to the vessel by a wire band I passed around the neck of the vessel beneath the rim $a$. When the vessel has been suspended, it is then filled with water and supplied from time to time, as necessary, care being taken that the water shall not become exhausted. The water seeps through the porous vessel and the moss and ferns grow naturally and luxuriantly, and the danger of their suffering from want of water is avoided. Attention is required ordinarily only once in two days, but that will depend upon the size of the earthen vessel and the dryness of the atmosphere. I have in practice successfully used for this purpose the earthen vessel known in Southern California as an "olla." The vessels are peculiarly adapted for this purpose, owing to their porous nature. After a time of growth the moss and fern roots will attach themselves to the material of the jar and grow thereon as naturally as they grow upon the porous rocks of their native cañons.

Now, having described my invention, what I claim as new, and desire to secure by Letters Patent, is—

1. A fernery composed of a water-containing porous vessel through which the water will seep, and an outer mat of fern root containing material fastened around the outside of the vessel and adapted for holding moisture and sustaining the growth of the ferns.

2. The combination of the suspended water-containing porous vessel through which the water will seep; the outer covering of moss with fern roots embedded therein applied to and surrounding the outside of the vessel, and the netting surrounding the outside of the covering of moss and fastened at the mouth of the vessel.

3. The combination of the open mouthed porous water-containing vessel through which water will seep; the outer covering of moss with the fern roots embedded therein applied to and surrounding the outside of the vessel; the netting surrounding the moss covering; and the stitching through the netting and over the mouth of the vessel.

4. The mat for a fernery composed as set forth of the netting, the moss covering on the netting, the fern roots embedded in the moss opposite the netting, and the stitching which passes through the netting and is arranged to secure the fern roots and the moss to the netting.

ALICE FITZ-GERALD.

Witnesses:
   G. PURCELL FITZ-GERALD,
   JAMES R. TOWNSEND.